United States Patent
Quirt

(12) 
(10) Patent No.: US 6,374,294 B1
(45) Date of Patent: Apr. 16, 2002

(54) METHOD AND APPARATUS FOR NEGATING INVALID NETWORKING ADDRESSES

(75) Inventor: Alan Richard Quirt, Kanata (CA)

(73) Assignee: Nortel Networks Limited, St-Laurent, Quebec (CA)

( * ) Notice: Subject to any disclaimer, the term of this patent is extended or adjusted under 35 U.S.C. 154(b) by 0 days.

(21) Appl. No.: 09/219,314

(22) Filed: Dec. 23, 1998

(51) Int. Cl.[7] .............................................. G06F 15/177
(52) U.S. Cl. ....................... 709/221; 709/223; 709/228
(58) Field of Search .................................. 709/221, 223, 709/238, 244, 245, 203, 219, 227, 105, 228; 379/219

(56) References Cited

U.S. PATENT DOCUMENTS

| | | | | |
|---|---|---|---|---|
| 5,434,914 A | * | 7/1995 | Fraser | 379/219 |
| 6,016,512 A | * | 1/2000 | Huitema | 709/245 |
| 6,026,445 A | * | 2/2000 | Kephart et al. | 709/245 |
| 6,032,196 A | * | 2/2000 | Monier | 709/245 |
| 6,061,738 A | * | 5/2000 | Osaku et al. | 709/245 |
| 6,078,943 A | * | 6/2000 | Yu | 709/105 |
| 6,101,537 A | * | 8/2000 | Edelstein et al. | 709/219 |
| 6,173,313 B1 | * | 1/2001 | Klots et al. | 709/203 |
| 6,199,065 B1 | * | 3/2001 | Kenyon | 709/227 |

OTHER PUBLICATIONS

M. Andrews, RFC 2308: Negative Caching of DNS Queries (DNS NCACHE), Mar. 1998, 14 pages.*
P. Mockapetris, RFC 1034: Domain Names—Concepts and Facilities, Nov. 1997, 40 pages.*
P. Mockapetris, RFc 1035: Domain Names—Implementation and Specification, Nov. 1997, 40 pages.*

* cited by examiner

*Primary Examiner*—Patrice Winder

(57) ABSTRACT

The invention relates to a method for negating network addresses from a software system, more particularly to a method for canceling hardware and software addresses from an Address Registry. This invention allows communication directed to negated addresses to fail at once rather than after a lengthy delay during which the communication protocol would wait for a response from the message system.

13 Claims, 12 Drawing Sheets

METHOD AND APPARATUS FOR NEGATING INVALID NETWORKING ADDRESSES

FIELD OF THE INVENTION

This invention relates to a method and a system for negating network addresses It is particularly applicable to network applications and may be used to negate obsolete network addresses such as hardware network addresses and software module addresses. The invention also extends to a computer readable storage medium including a program element executable by a general-purpose computer to implement the network address negation functionality.

BACKGROUND

Distributed processing is a powerful way to make software scaleable. Many standards for distributed processing exist and are commonly used. As a specific example, the Common Object Request Broker Architecture (CORBA) provides a basic mechanism for transparently distributing software objects across multiple processors connected to a network. Communicating CORBA software objects may be written in a variety of programming languages, and may run on a variety of computer processor types. The communication, and any needed translation between the different data formats of varying processor types and programming languages, is handled automatically by CORBA. CORBA is a standard defined by the Object Management Group (OMG) For more information on the CORBA standard the reader is invited to consult "The Essential CORBA: Systems Integration Using Distributed Objects", by Thomas J. Mowbray and Ron Zahavi, Object Management Group Inc, 1998, whose content is hereby incorporated by reference.

Telecommunication software is an example of a distributed network system. Typically, entities (software and hardware) in a distributed system communicate with one another by sending messages.

To provide a more reliable communication, communication protocols have built-in message acknowledgement capabilities. The protocol dictates that a message must be re-sent when no acknowledgement to a previous message is received from the addressee. Typically, the communication protocol defines the number of times the sender will re-send a message and how long the time intervals between resent messages will be. Usually, the time before retransmission increases for each retransmission of the same message. If no acknowledgment is received after a pre-determined number of times that a given message is resent, an error is generated For instance, a message sender may set a timer when it sends the original message, and automatically re-send the message if an acknowledgement fails to arrive before the timer expires.

Such communication protocols may be implemented either at system level or application level. Repeating a message when no acknowledgement is received is well known in the field of data communication. Specific examples of such protocols include the Internet TCP/IP protocol and the Novell IPX protocol.

A deficiency of these frequently used protocols is that if a formerly valid destination of a message becomes invalid, the protocol typically returns an error to the sender only after a long delay during which the message is sent many times. This results in delays in corrective action such as reporting the problem to the sender of the message. Commonly this problem is ignored under the assumption that invalid addresses are relatively rare in the system and that negating them systematically would be prohibitive.

A possible solution to this problem is to maintain a list at the system level of all clients who hold copies of a given software address. If the system determines that an address is invalid, all clients are informed. This eliminates delays due to use of addresses that have been discovered to be invalid, and permits all entities holding copies of the address to be up to date. However, this approach is wasteful since the system must maintain a list of clients for every address that may be negated, requiring a large amount of memory. Furthermore, upon negation of an address, the system must inform all the clients even though many of them might not intend to use the cancelled address again. Additionally, the clients must be configured to be able to receive a negation message and update their address lists accordingly. In an existing system this may be a costly endeavor.

Thus, there exists a need in the industry to provide an improved system and method for negating invalid addresses in a network system.

SUMMARY OF THE INVENTION

For the purpose of this specification, the expression "software object" is used to designate a collection of related data with an interface that defines the operations available on that data. The software code for the software object is generally written in a programming language appropriate to its functions, such as Smailtalk, C++, Pascal, Java, or Assembler.

For the purpose of this specification, the expression "persistent name" is used to designate the static name of a software entity that external software objects use to communicate with it. The persistent name is typically independent of the location of the software entity in the software system. In a specific example, the persistent name of an object is in the form of a character string.

For the purpose of this specification, the expression "software object address" is used to designate the software location of an instance of a software object in a software system. This expression should be given a broad interpretation to include a handle to actual object addresses, handles to memory locations containing software addresses and other equivalents. Typically, within the object address is a hardware node address that specifies the network location of the software object. In the preferred embodiment, a Name Service translates the persistent name of a software object into its software object address. A particular object with a certain persistent name maintains its persistent name irrespective of the instantiation of that object. On the other hand, each instantiation of a certain object is typically given a different object address that is valid only for that particular instantiation. For example, if a subsystem of a distributed software system is taken out of service then is subsequently restarted on the same node or on some other node, each object in the restarted subsystem keeps the same persistent name that it had formerly, but is given a new object addresses.

For the purpose of this specification, the expression "visible software object" is used to designate a software object that may communicate with external software objects in software system.

In the preferred embodiment of this invention, addresses used in communication are stored in system-managed data structures, herein referred to as the Address Registry. Software objects in the software system access addresses in the Address Registry through handles or equivalent forms of indirect access. A common form of communication in such software systems is through message passing. The destination addresses of messages being sent from one software object to another are passed in the form of handles to entries held in the Address Registry. This use of handles or references to actual destination addresses is common in message systems such as CORBA. When a software object address is found to be invalid, it is cancelled by marking it invalid in the Address Registry, a process herein referred to as negating. When any holder of a handle to that address attempts to use the negated software object address, the message system by looking at the Address Registry determines that the address is invalid and returns an error at once without attempting to send the message. Software objects learn of the negation of a given software object address when they attempt to use the negated software object address. In this regards, software objects do not need to wait for a message to be sent multiple times and the message system does not need to maintain a list of the software objects that hold handles to a particular address in the Address Registry.

The invention also extends to a computer system implementing the above described Address Registry, and to a method for implementing a software Address Registry.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

Figure 1:
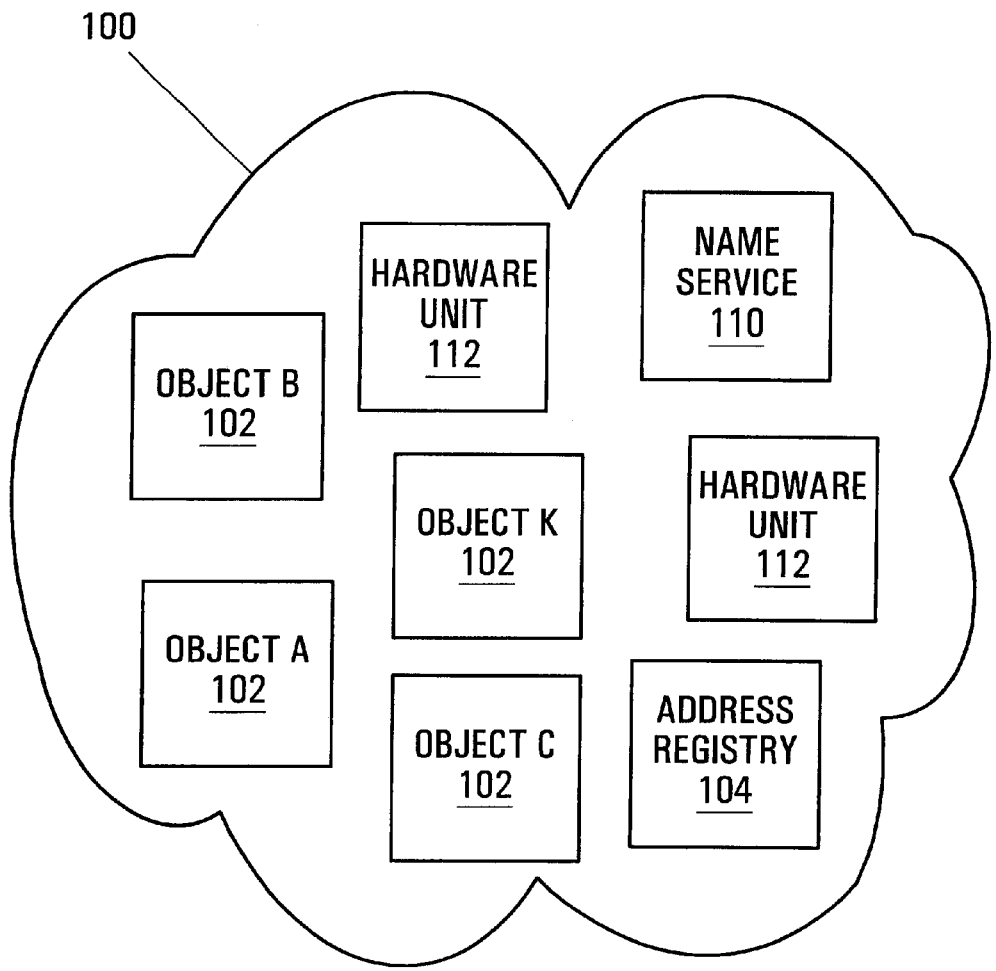
FIG. 1 is a block diagram of a software system including an Address Registry.

In the preferred embodiment of this invention, as shown in FIG. 1, the Address Registry 104 is integrated in an object oriented software system 100 comprising a plurality of software objects 102 and hardware entities 112. The software objects 102 and hardware entities 112 perform tasks within the software system and may communicate with one another through messages. All the software objects and hardware entities 112 need not reside in the same physical location. The object oriented software system 100 includes a Name Service 110 that allows a given software object or hardware entity to locate another software object or hardware entity in the software system through the use of a persistent name.

In order to refer to individual software objects in a software system, a persistent name is given to each software object. The persistent name allows software objects to communicate with other software objects in the software system irrespective of the software objects location in the software system. To communicate with a software object, the location of that software object in the network must be resolved into a software object address. Amongst other information, the software object address may comprise information about the network node on which the software object is located or other information to help locate the software object in the software system. In the preferred embodiment of this invention, software object addresses used in communication are stored in system-managed data structures, herein referred to as the Address Registry. The system managing the data structures may be the operating system, a message system such as CORBA or any other suitable system related to the managing of messages. The Address Registry comprises a plurality of entries each entry being associated to a software object in the software system.

Figure 2:
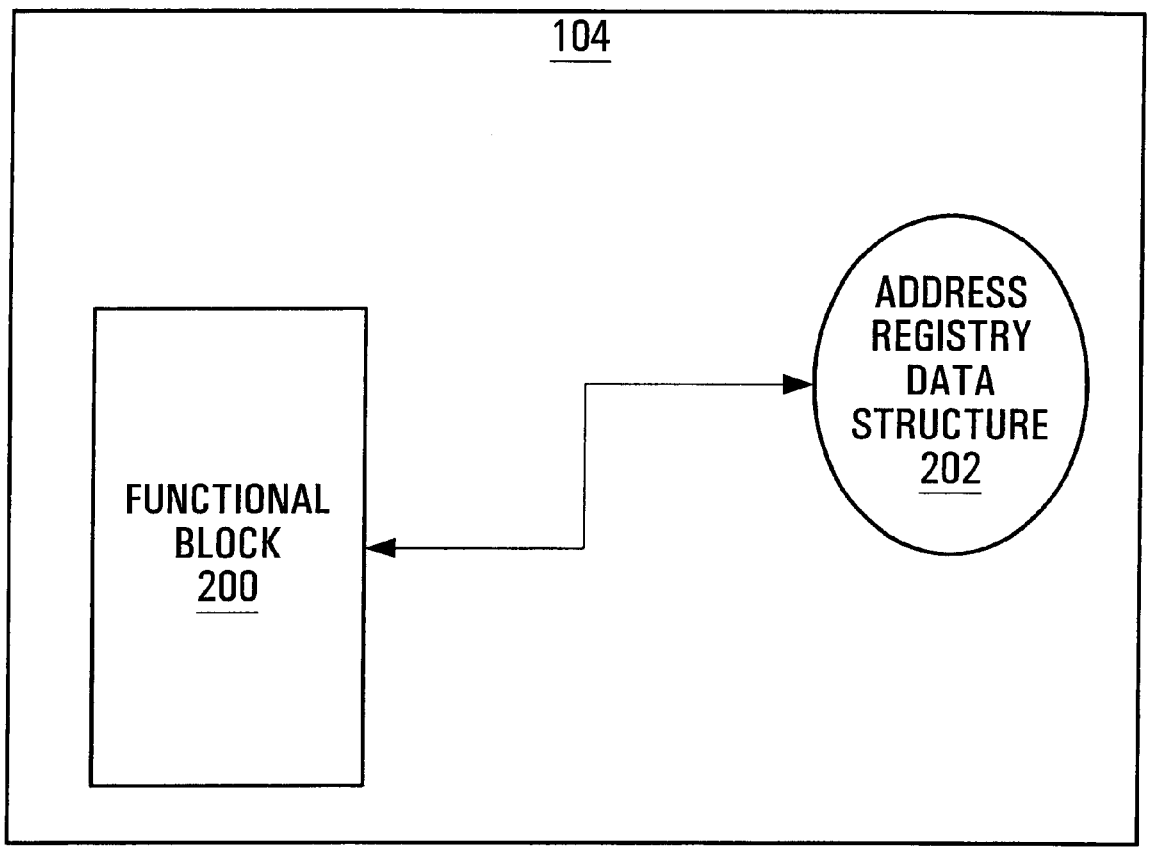
FIG. 2 is a block diagram of the Address Registry.

As shown in FIG. 2, the Address Registry 104 includes a data structure 202 for storing network software object addresses for the entities in the software system and a functional block 200. Typically, the data structure 202 contains the software addresses of software and hardware modules in a software system. In a specific example, the data structure 202 is in the form of a table. In a variant, the data structure 202 is a structure that allows an efficient search of the Address Registry on the basis of a certain data element in the data structure. In another variant, the Address Registry data structure may be distributed in the software system. A particular example of a distributed Address Registry includes a Central Address Registry data structure, herein designate as Central Address Registry, having entries for each visible software object in the software system and subservient Address Registry data structures containing subsets of these entries. Generally, the subservient Address Registries are associated to individual nodes (Local Address Registry) or groups of nodes (Cluster Address Registry). Variations in the arrangement of the Address Registry are possible without departing from the spirit of this invention. The functional block 200, which may be part of the operating system, allows the manipulation and modification of entries in the Address Registry data structure 202.

The software object address of a given software object may be obtained by a certain object in a message received from the given software object, in a message received from another software object or by requesting a look-up from the Name Service 110. The actual object address is stored in the Address Registry 104 and only a handle to it is obtained by a given object. Other methods to refer to the software object address are possible without departing from the spirit of the invention provided that the software object using the software object address refers to it indirectly. Typically, when objects send object addresses as parameters in a message, they use a handle to the object address in the Address Registry. When a handle to an object address is passed as a parameter in a message, the message system may place the actual object address in the message rather than sending only a handle to the actual object address. This may be desirable in the case where a handle to the object address is not valid at the destination of the message. In such cases, the actual object address is sent in the message. When the message reaches its destination, the message system at the destination will place the actual object address into its own Address Registry, and will as usual give to the addressee of the message only a handle to that entry in the Address Registry local to the addressee. In a specific example, an object A located on a node X may send a message along with its software object address to an object B on node Y. The handle to the object address of object A may not be valid in node Y. Therefore, the message system on node X will place an actual copy of the object address in the message whose destination is object B. The message system on node Y will receive the message, search its Local Address Registry for a corresponding entry. If the entry doesn't already exist, the message system of node Y will create the entry. Following this, the message system on node Y will give object B a handle to the entry in the Address Registry local to object B containing the actual object address of object A. This procedure permits senders and receivers of messages to use handles rather than actual object addresses, even when it is necessary to pass actual object addresses rather than handles in messages. This procedure or an equivalent procedure is commonly used in CORBA message systems.

The Name Service 110 is an entity which is located at a well-known location in the distributed software system and which keeps an entry for every visible software object in the software system. In a preferred embodiment the Name Service 110 is itself software object. It typically has tables that map persistent names to software object addresses. The Name Service, like other objects in the software system, does not have the real software object address values in its own tables but instead has handles or other indirect referencing means to the actual software object addresses in the Address Registry 104 tables. In a most preferred embodiment, each entry in the Name Service includes the persistent name and a handle to the Address Registry data structures entry containing the software object address corresponding to the persistent name. A specific example of a portion of a Name Service table is shown below.

| ENTRY # | PERSISTENT NAME | | SOFTWARE OBJECT ADDRESS HANDLE |
|---------|-----------------|-----------|----------------|
| 1 | USER | 555-0000; | A452C67 |
| 2 | USER | 555-1000; | B56345E |
| . | . | . | . |
| . | . | . | . |
| . | . | . | . |
| K | TERMINAL | V01; | AFE5270 |
| K + 1 | TERMINAL | V50; | BF35516 |

Figure 10:
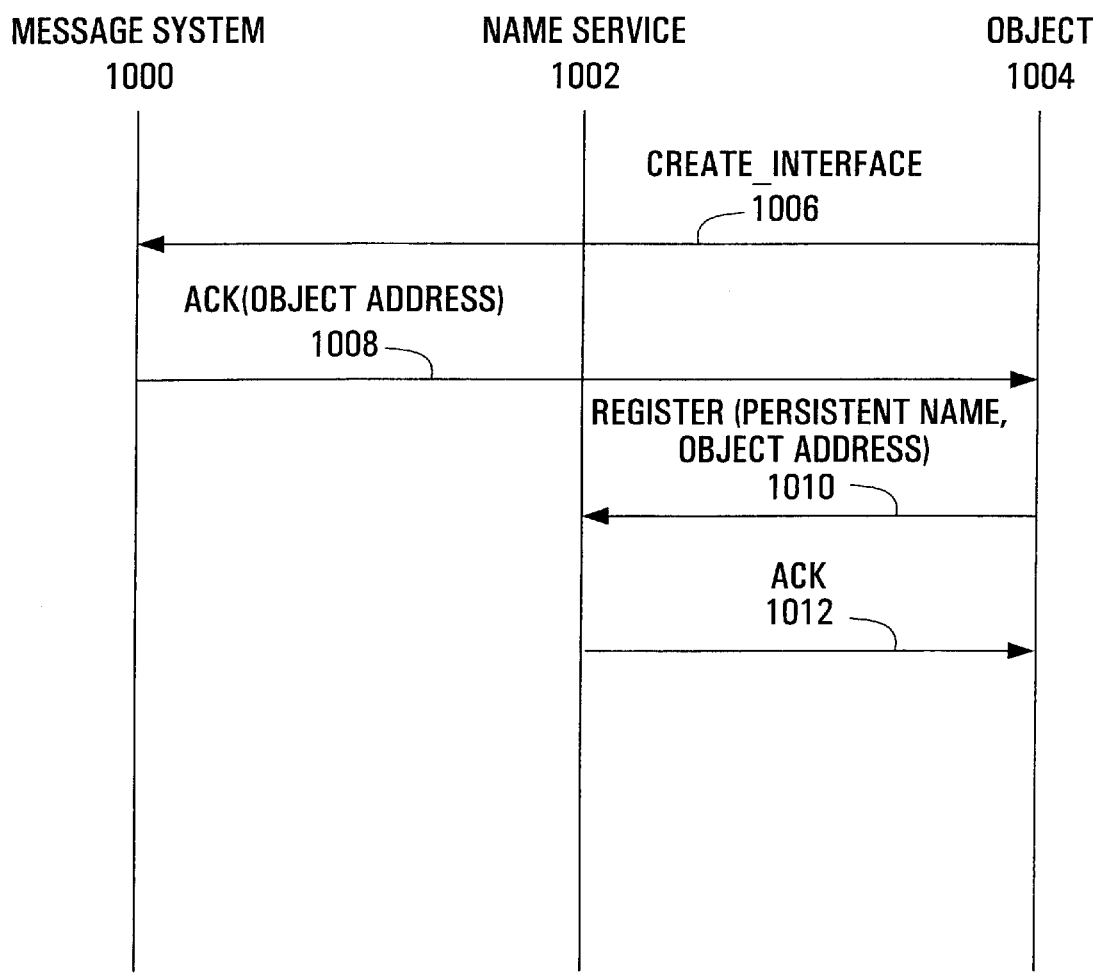
FIG. 10 shows a flow diagram of the events occurring during initialization of a software object in a distributed software system, in accordance with the spirit of the invention.

In a preferred embodiment of the invention, software objects operating in a software system making use of this invention register their software object addresses and persistent names with the Name Service. Upon initialization, as shown in FIG. 10, a software object 1004 in the software system sends a request 1006 to the message system 1000 requesting that an interface be created for it. The message system 1000 creates an interface and assigns to it a unique software object address. The message system also creates an entry in the Address Registry for the software object address. The message system 1000 then returns an acknowledgement message 1008 to the software object 1004 containing a handle to the software object address in the Address Registry. The software object 1004 then registers with the Name Service 1002 by sending its persistent Name, the handle to its software object address in the Address Registry and other relevant information to the Name Service in the form of a registration message 1010. The Name Service 1002 creates an entry in its tables for the new software object and returns an acknowledgement message 1012 to the software object 1004. The registration with the Name Service 1002 gives the Name Service a handle to the entry in the Address Registry corresponding to the software object 1004.

Figure 6:
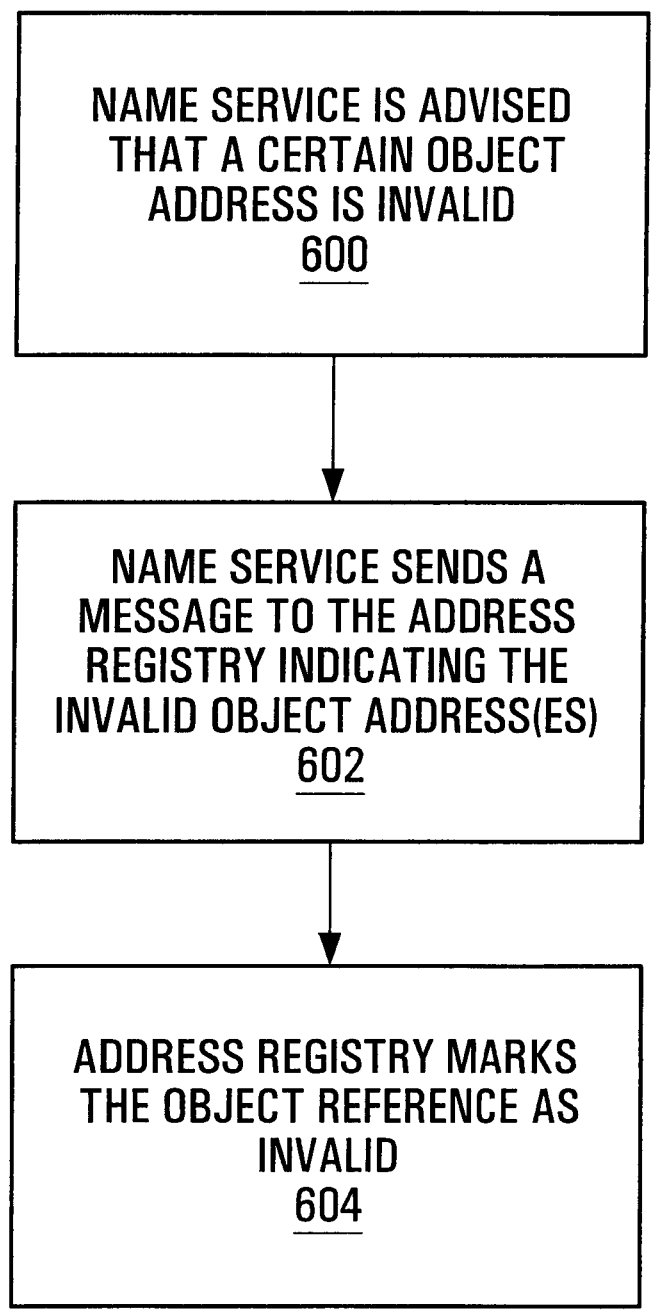
FIG. 6 is a flow diagram of the process for identifying an entry in the Address Registry as invalid according to the spirit of the invention.

The present inventors have made the unexpected discovery that by providing for each entry in the Address Registry an indication of the validity of status of object addresses, messages addressed to object address previously found to be obsolete could be returned to their senders without the need to resend the message several times. The Address Registry provides a data element associated to each address in the Address Registry providing a validity indication. An invalid object address can be marked as invalid by negating the entry of that object address. When a certain object attempts to send a message to a negated address, the message system which manages the Address Registry notices that the address is invalid and immediately returns an error message to the certain object from which the message originated In a preferred embodiment, the Name Service informs the Address Registry of obsolete software objects and network addresses. In a typical interaction, as shown in FIG. 6, at step 600 the Name Service determines that a certain software object address is no longer valid. There may be several reasons why a software object address in a message system becomes obsolete. For example:

1. A new software object instance replaces a given software object instance in the software system;
2. When a software spare takes over the operation of a software master; and
3. When a complete hardware node fails.

The person skilled in the art will readily see how the concept can be applied to other situations in accordance with the spirit of the invention.

In a first example, when a Name Server receives a new registration for an existing persistent name, it replaces the old software object address by the new software object address and the previous software object address associated with that persistent name becomes obsolete The Name Service informs Address Registry by sending a command or message to the Address Registry advising that the old software object address is invalid.

In the second example, when software sparing is used, for each active (Master) software object there is a spare software object waiting to take over if the master fails. The spare software object constantly monitors the health of the master, and on failure can register itself with the Name Service as the new master. The software object address of the master is then invalidated in the Address Registry. This invalidation may be performed by the Name Service when the spare object registers itself under the name of the service, or it may be performed by the spare object itself. For more information about such software sparing, the reader is invited to consult co-pending application Ser. No. 08/936,119 whose content is hereby incorporated by reference.

In the third example, the Name Service may be made aware that an entire node has failed rendering all software object addresses referring to that node invalid. The Name Service may be made aware of the failure through an operating system notification or other suitable means.

Once the Name Service or other software object has determined that a certain software object address is invalid, it sends a message to the Address Registry 104 indicating the invalid software object address 602. The functional block 200 of the Address Registry 104 processes the received message and negates the entry corresponding to the software object address. When any holder of a handle to that entry attempts to use the software object address, the message system discovers that the software object address is invalid and returns an error at once without attempting to send the message. Software objects learn of the cancellation of a given software object address when they attempt to use the cancelled software object address.

Figure 5:
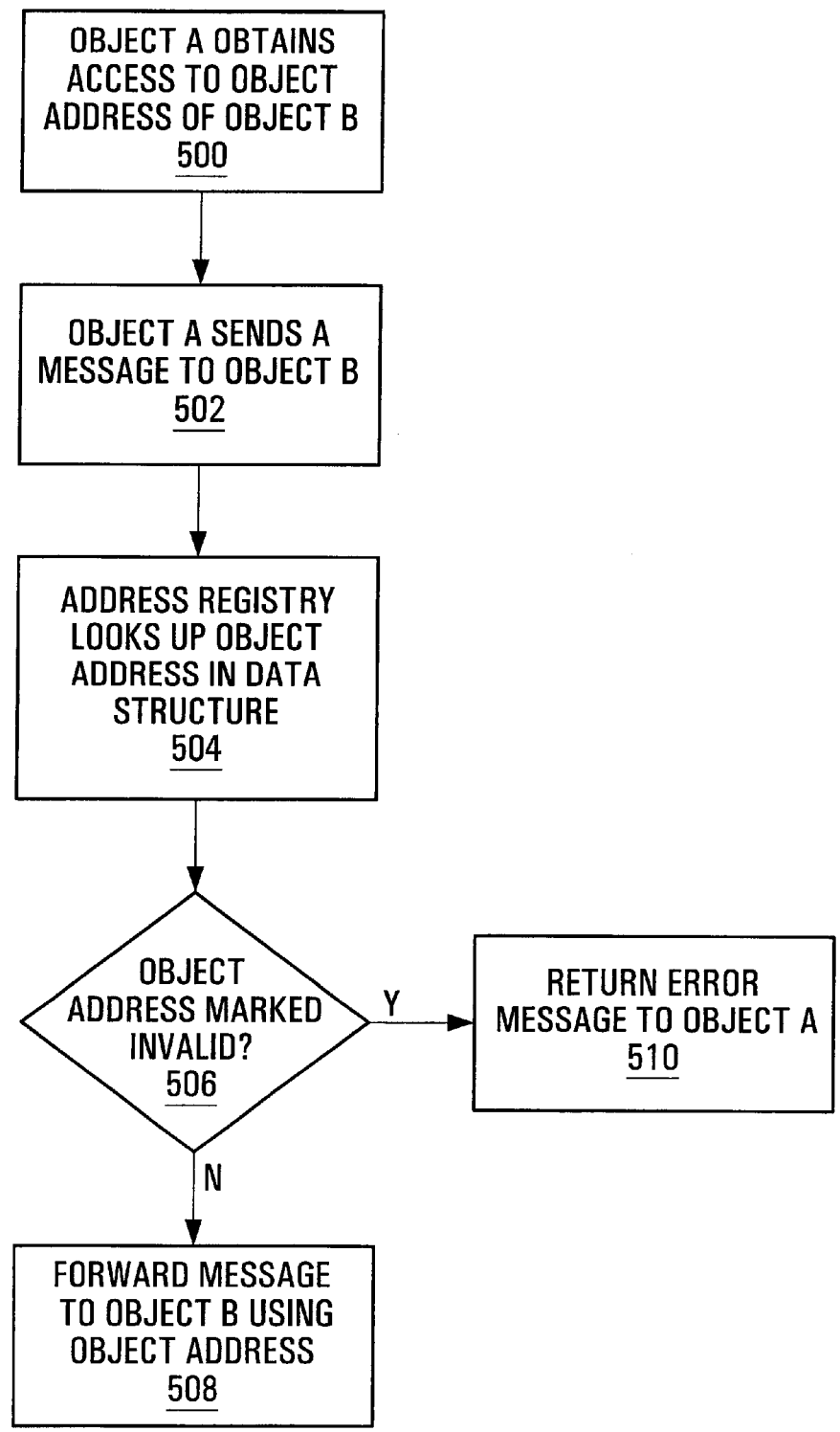
FIG. 5 is a flow diagram of the process of sending a message, in accordance with the spirit of the invention.

Consider a detailed example illustrated in FIG. 5. A software object A wants to send a message to a software object B. Assume that software object A has previously obtained the software object address of software object B 500 in the Address Registry. The software object A attempts to send the message to software object B by accessing the software object address being stored in the Address Registry 502. The Address Registry functional block 200 looks up the software object address 504 in the Address Registry data structure 202 and verifies if the software object address is still valid. If the software object address is marked invalid, condition 506 is answered in the affirmative and the message system returns an error message 510 to software object A indicating that the software object address is invalid. Typically, this causes A to look-up the software object address of software object B using the Name Service where typically the tables have been updated to reflect the new object address of software object B. If the software object address is not marked invalid in the Address Registry, condition 506 is answered in the negative and the message system forwards the message to software object B using the software object address in the Address Registry data structure 202.

Figure 3A:
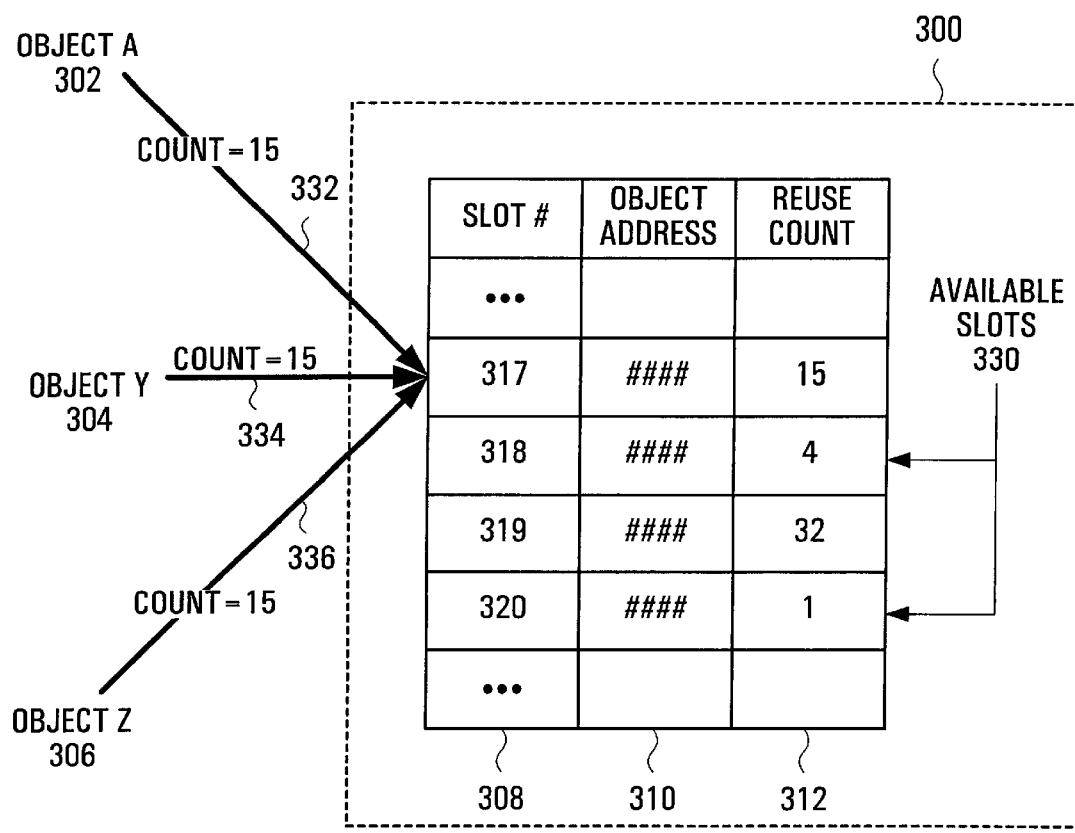
FIGS. 3a and 3b depict a preferred embodiment of the Address Registry data structure.

In a preferred embodiment of the invention, as shown in FIG. 3a, the Address Registry data structure 202 is in the form of a table and each entry is treated as a "slot" whose content may change from time to time A slot is a region of memory at a particular address. Each slot has a slot reuse count 312, and each client handle 332, 334 and 336 is extended to include a copy of the value of the slot reuse count at the time when that handle was created. To invalidate a table entry, all that is necessary is to modify the entry's reuse count 312 field so that it no longer matches the values held by clients. Preferably, the Address Registry data structure maintains a list of available slots 330. In a specific example, the list of available slots is in the form of a linked list.

In a specific example, the Address Registry is a table with 1000 slots. Software object A 302 looks up the software object address of software object B using the Name Service. The Name Service searches the Address Registry 300 for an entry corresponding to software object B. If no corresponding entry is found, the Name Service obtains a software address and places the software object address of software object B in an empty slot. For the purpose of this example, let us say that the software object address for software object B is placed in slot #317. Software object A is given a handle data structure 332 consisting of a handle to slot #317 and a copy of the slot's reuse count at that instant. In this particular example the slot's reuse count is 15. As time goes by, software objects different from software object A, namely software object Y 304 and software object Z 306, look up software object B in the Name Service. All of these software objects get handles 334 336 to slot #317, with the same reuse count (count=15) that software object A got.

Figure 3B:
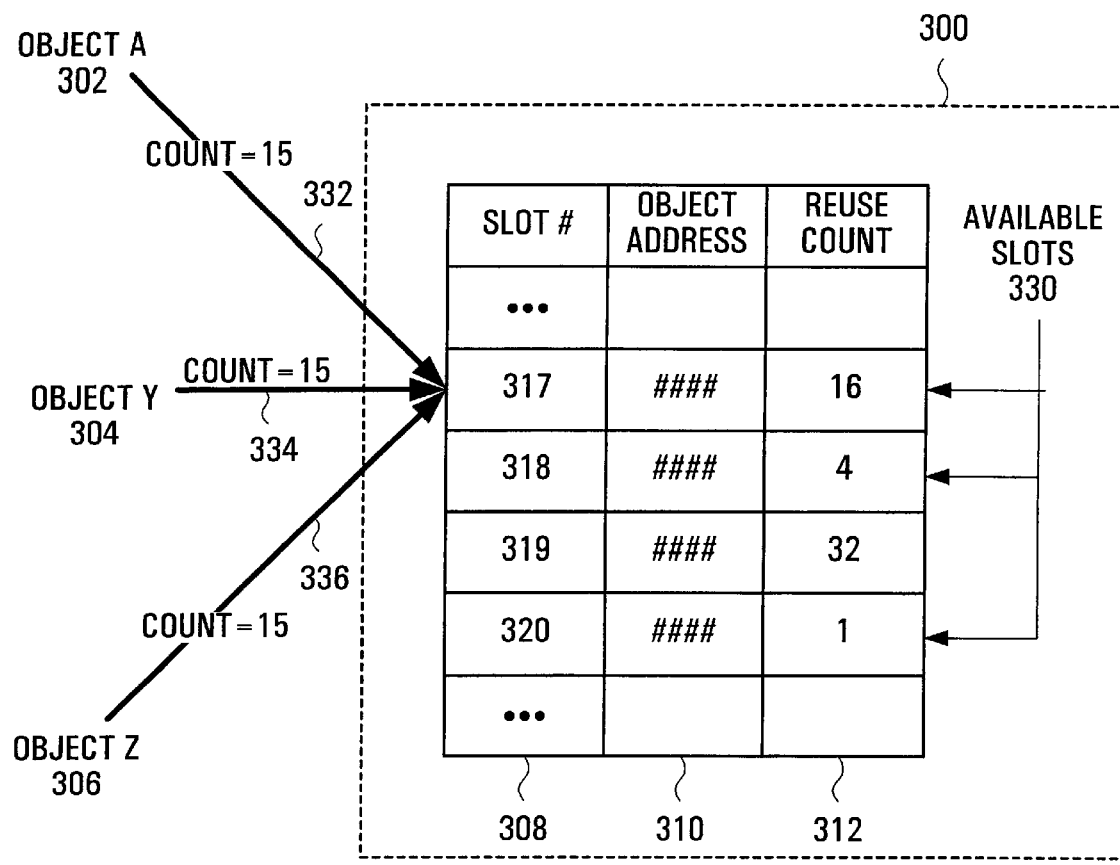

At some time, the Name Service or some other object in the software system is advised that the software object address of software object B is invalid and that the Address Registry entry for software object B (slot #317) is therefore obsolete. In a preferred embodiment, as shown in FIG. 3b, slot #317's reuse count 312 in incremented and slot #317 is placed in the available-slot list 330. Incrementing the slot reuse count negates the address contained in the slot. At some later time, software object Y 304 uses its handle 334 to try to send another message to B. The Address Registry compares the slot reuse count 312 associated with slot #317 with the count associated to the handle 334 (count=15). The Address Registry sees that the count associated to the handle (count=15) is not the same as the one in slot #317, so it immediately returns an error to software object Y 304. Software object Y 304 will now use the Name Service to get the new software object address of software object B, and will obtain a new handle that points to some other slot in the Address Registry.

Figure 4A:
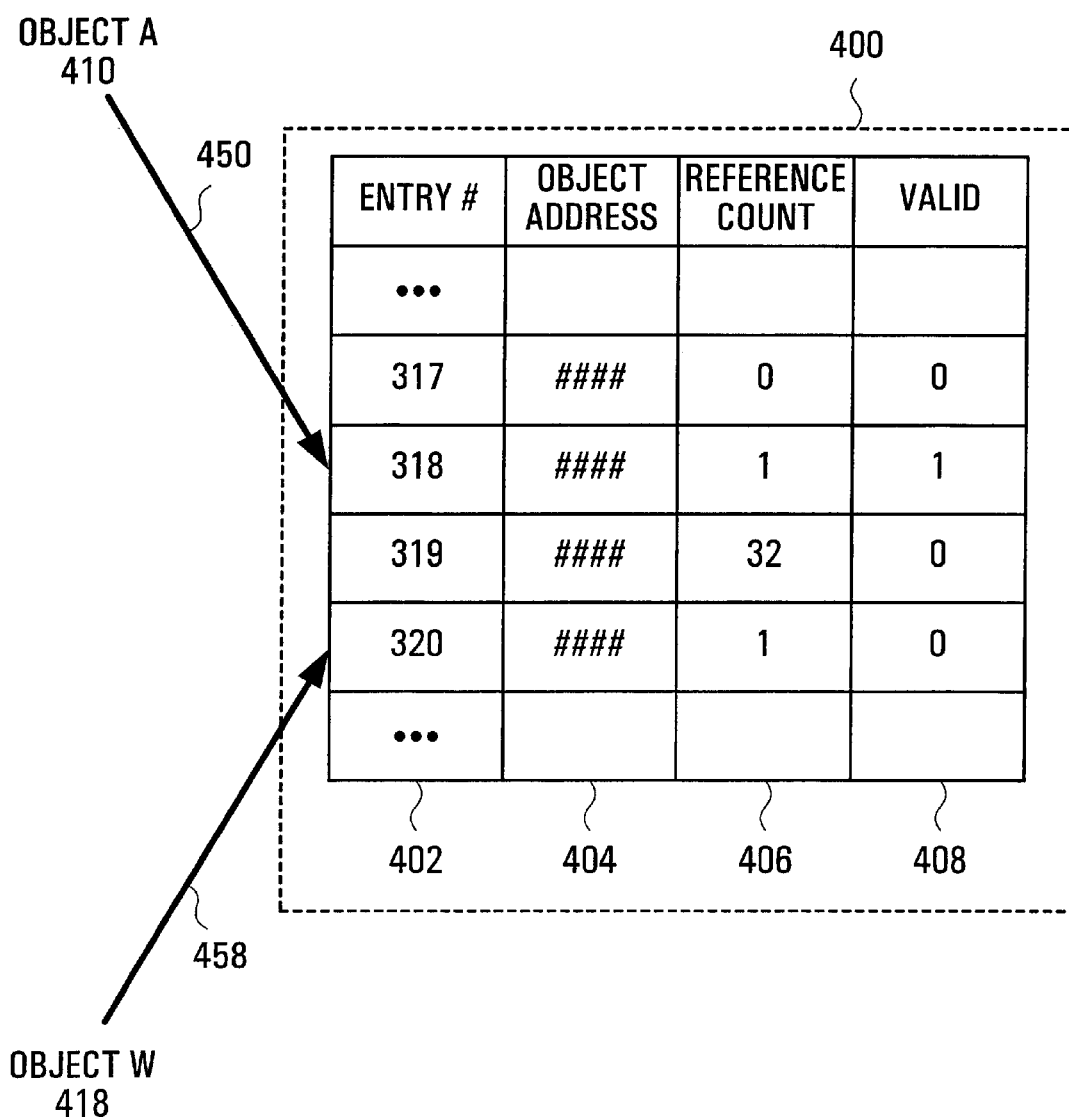
FIGS. 4a and 4b show a variant of the Address Registry data structure.
Figure 4B:
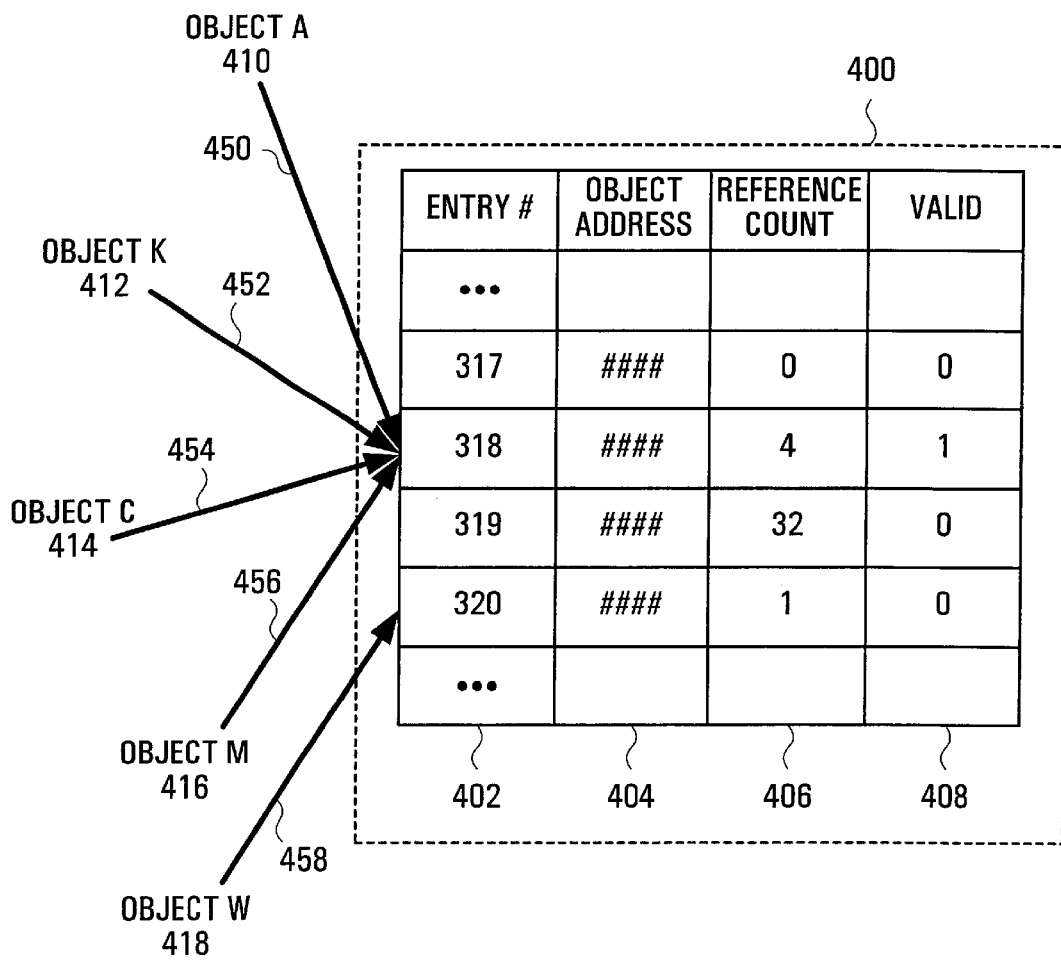

In an alternative embodiment, as shown in FIG. 4b, for each software object the Address Registry 400 stores an entry. An entry is a region of memory at a particular address containing the software object address 404 of the software object, a validity indicator 408 and a reference count 406. In this approach the validity indicator indicates that the address is valid or invalid. The reference count 406 is the number of software objects in the software system having handles to the given entry. To invalidate a table entry, all that is necessary is to modify the entry's validity indicator 408 to indicate that the entry is invalid. In a specific example, the validity indicator is a binary digit with "0" indicating that the entry is invalid and "1" indicating that the entry is valid. Other conventions for validity indicators are possible without detracting from the spirit of the invention.

In a typical interaction, as shown in FIG. 4a, when a client, say software object A 410, looks up the software object address of software object B using the Name Service. The Name Service searches the Address Registry 400 for an entry corresponding to software object B. If no corresponding entry is found, the Name Service obtains the software address of object 5 and creates a new entry for it. Software object A 410 is given a handle 450 to that entry. For the purpose of this example, the entries in the Address Registry are numbered and software object A has a handle 450 pointing with entry #318. The count field 406 of entry #318 is set to "1" since a single software object refers to the entry and the validity field 408 also reflects that the entry is valid. Whenever other clients, said software objects K software object C and software object M use the same software object address, as shown in FIG. 4b, they are given handles 452 454 456 to the existing table entry #318. The corresponding reference count 406 in the table entry is also incremented for each software object having a handle to the given entry. At some time, the Name Service or some other entity in the software system is advised that the software object address of software object B is invalid and that the Address Registry entry for software object B (slot #318) is therefore obsolete. The validity field 408 corresponding to software object B is negated. In a specific example, this is done by setting the validity field to 0. If a new copy of the invalid address arrives in a message, and a table entry still exists for it, the new client will receive a handle to the existing table entry, which is correctly marked as invalid.

In a preferred embodiment, clients not requiring the use of a given software object address may formally release their handle to the given software object address in the Address Registry. In a typical interaction, when a software object formally releases a handle to a software object address, the corresponding reference count 406 is decremented.

Preferably, an invalid entry is kept in the Address Registry 400 until its reference count reaches zero.

At some later time, software object A 410 uses its handle 450 to try to send another message to S. The Address Registry tests the corresponding validity field to see if the entry is valid. The Address Registry sees that the entry is invalid, so it immediately returns an error to software object A 410. Software object A 410 will now use the Name Service to get the new software object address of software object B, and will obtain a new handle that points to some other slot in the Address Registry.

Other arrangements for storing entries and marking them invalid in an Address Registry are possible without detracting from the spirit of the invention. In a specific example, an address registry with reuse count, as illustrated in FIGS. 3a and 3b, could be extended to also include a reference count as illustrated in FIGS. 4a and 4b. In this example, a slot could be immediately negated by incrementing its reuse count and added to the available slots list if its reference count reached zero, even though the software object address in the slot might still be valid.

A variation of this invention may also be used within an Address Registry to implement a hierarchical or recursive validity indication. In a specific example, each software object address in a registry contains a node address, the node address being held indirectly in each software object address by a handle similar to the handles 332, 334, and 336 but referring to that software object's node address. In this example, the address registry data structure 202 may include a table in which each unique node address used in any software object address appears once, and is pointed to by a handle in each software object address belonging to that node A validity indicator similar to the reuse count in FIGS. 3a and 3b may be associated with each such node address. If the system determines that all software object addresses associated with a particular node have become invalid, for example because the node has been restarted, the reuse count for that node address may be incremented. Each software object address whose handle for that node contains the node's old reuse count can be immediately treated as invalid, without waiting for the Name Service or other objects in the system to inform the Address Registry of the failure of the individual software objects that are no longer operational.

Figure 9:
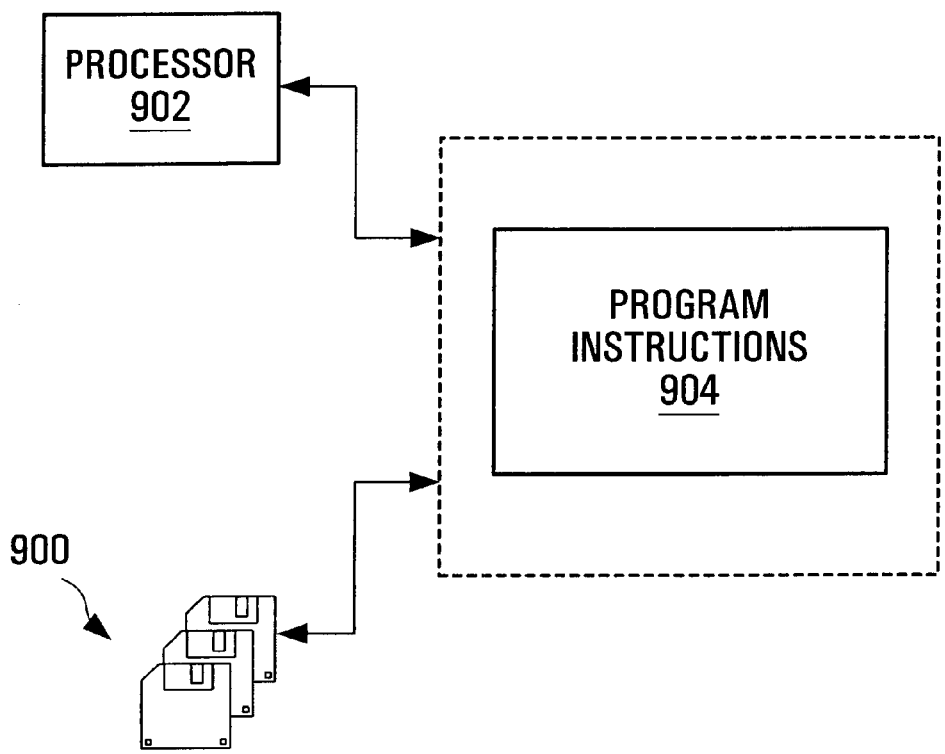
FIG. 9 is a structural block diagram of a computing apparatus on which the Address Registry in accordance with the invention can be implemented.

In a preferred embodiment, the Address Registry is implemented using a suitable programming language. In a specific example, the Address Registry is implemented within a CORBA message system using the C++programming language, and is run on a Unix or VxWorks platform. The Address Registry in accordance with the spirit of the invention may run on any other suitable computing platform without detracting from the spirit of the invention. As shown in FIG. 9 such computing platform typically includes a processor 902 in operative relationship with a memory containing program instructions 904 implementing the module described in this specification. The computer program 904 may be stored on any suitable computer readable medium 900.

Figure 7:
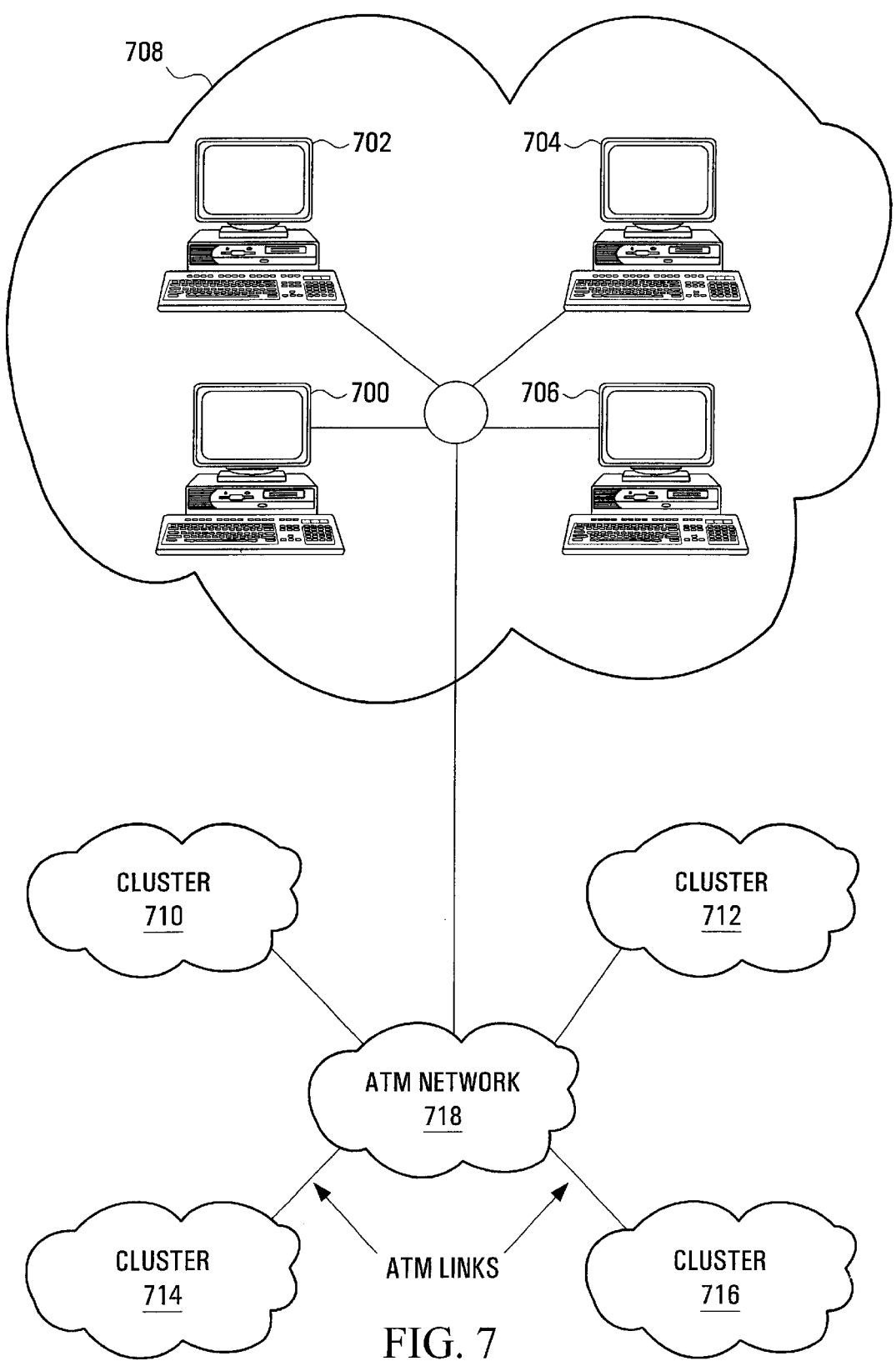
FIG. 7 illustrates a distributed computing network where the Address Registry in accordance with this invention can be implemented.
Figure 8:
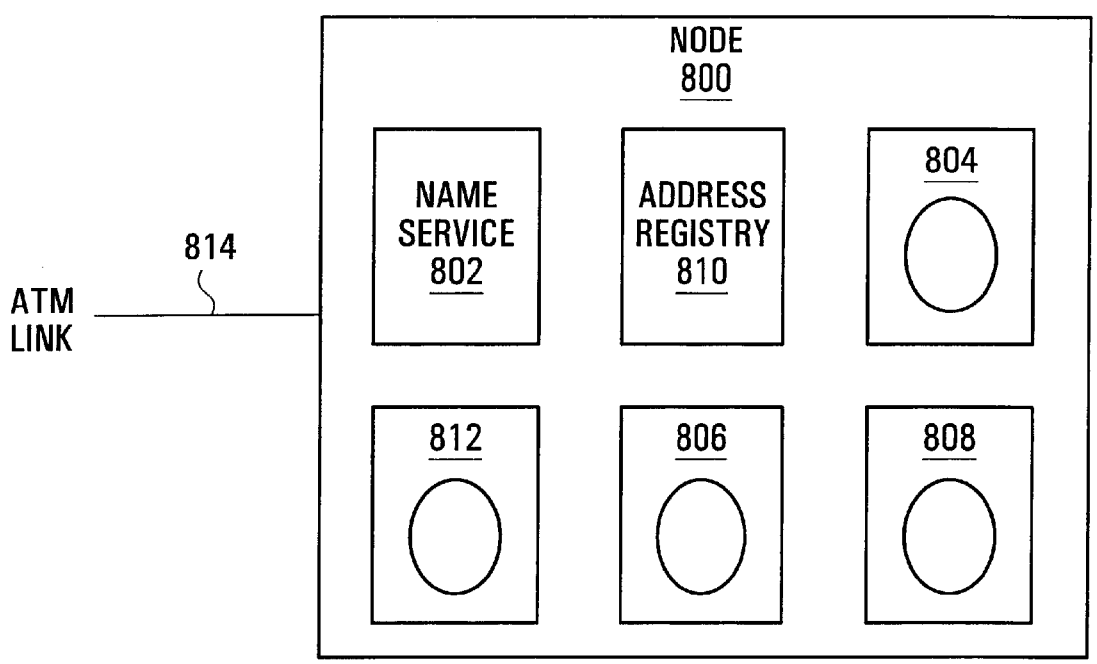
FIG. 8 is a functional block diagram of an apparatus implementing the Address Registry in accordance with the spirit of the invention.

The systems that can make use of the invention may be a single discrete computing apparatus or be of a distributed nature. In a distributed system, as shown in FIG. 7, different parts of a software application run on different computing machines that are interconnected to form a network. These physical machines, herein designated as nodes 700 702 704 706, may reside in geographically remote locations, and communicate using a set of predefined protocols. The software objects and software modules described in this specification operate on these nodes. FIG. 8, shows in lock form a node 800 containing software objects 804 806 808 810 812. The node also contains a Name Service and an Address Registry. The software objects 804 806 808 812 may communicate with each other or with software object in other node through the ATM link 814 using the software object address and the Address Registry in accordance with the spirit of the invention. The set of nodes 700 702 704 706 are grouped into a cluster 708. The nodes in the cluster may share resources and may perform functions in cooperation with one another. A set of clusters 708 710 712 714 and 716 are in turn interconnected through an ATM network 718. The ATM network 718 may be a private or public network. Protocols such as TCP/IP, client/server architecture and message passing are all possible methods of achieving communication between software objects in a distributed computing environment. In addition to these communication protocols a standard communication interface is used, such as those defined by the Software Object Management Group (OMG,) to allow access to the various software objects in the software system For more information on distributed processing, the reader is invited to consult Operating Systems by William Stallings, Prentice Hall $2^{nd}$ edition 1995, whose content is hereby incorporated by reference. The preferred embodiment of this invention uses the C++programming language with a CORBA (Common Software object Request Broker Architecture) interface. Other programming languages may be used in the context of the present invention and the use of such a language does not deter from the spirit of this invention.

Although the present invention has been described in considerable detail with reference to certain preferred versions thereof, other versions are possible. Therefore, the spirit and scope of the appended claims should not be limited to the description of the preferred versions contained herein.

I claim:

1. A computer readable storage medium including a program element for execution by a computing device for implementing an address registry, said program element including:
  a data structure including a plurality of entries associated to respective software objects, each entry including:
   a. an address data element indicative of a software object address;
   b. an address validation data element capable of being processed to determine whether the address data element is valid, said address validation data element being capable of acquiring a first state indicating a valid address data element and a second state indicating an invalid address data element;
  a processing functional block, responsive to reception of a message from a client software object indicative of a certain entry in said data structure, to:
   a. process the address validation data element associated to the certain entry to determine the validity of the address data element associated to the certain entry;
   b. if the address data element is invalid generate and issue to the client object an error message indicating that the certain entry does not contain a valid address data element.

2. A computer readable storage medium as defined in claim 1, wherein said processing functional block is operative to direct the message toward a destination pointed to by the address data element associated to the certain entry, when the address data element is valid.

3. A computer readable storage medium as defined in claim 2, wherein said processing functional block is operative to determine the validity of the address data element associated to the certain entry by processing the address validation data element associated to the certain entry and a data element in the message.

4. A computer readable storage medium as defined in claim 3, wherein said processing functional block compares the address validation data element associated to the certain entry and the data element in the message to determine if the address data element associated to the certain entry is valid.

5. A computer readable storage medium as defined in claim 4, wherein said processing functional block is responsive to an address negation command associated with a given entry in said database to alter the address validation data element associated to the given entry for marking the address data element associated to the given entry as invalid.

6. A computer readable storage medium as defined in claim 5, wherein said processing functional block alters the address validation data element associated to the given entry for marking the address data element associated to the given entry as invalid by incrementing the address validation data element associated to the given entry.

7. A computer readable storage medium including a program element for execution by a computing device for implementing an address registry, said program element including:
- a data structure means including a plurality of entries associated to respective software objects, each entry including:
  - a. an address data element means indicative of a software object address;
  - b. an address validation data element means capable of being processed to determine whether the address data element means is valid, said address validation data element means being capable of acquiring a first state indicating a valid address data element means and a second state indicating an invalid address data element means;
- code means for implementing processing means responsive to reception of a message from a client software object indicative of a certain entry in said data structure means, said processing means being operative to:
  - a. process the address validation data element means associated to the certain entry to determine the validity of the address data element means associated to the certain entry;
  - b. if the address data element means is invalid generate and issue to the client object an error message indicating that the certain entry does not contain a valid address data element means.

8. A computing apparatus including:
- a processor;
- a memory in operative relationship with said processor;
- program element in said memory for execution by said processor for implementing an address registry, said address registry including:
  - a. a data structure including a plurality of entries associated to respective software objects, each entry including:
    - i. an address data element indicative of a software object address;
    - ii. an address validation data element capable of being processed to determine whether the address data element is valid, said address validation data element being capable of acquiring a first state indicating a valid address data element and a second state indicating an invalid address data element;
  - b. a processing functional block, responsive to reception of a message from a client software object indicative of a certain entry in said data structure to:
    - i. process the address validation data element associated to the certain entry to determine the validity of the address data element associated to the certain entry;
    - ii. if the address data element is invalid generate and issue to the client object an error message indicating that the certain entry does not contain a valid address data element.

9. A computing apparatus as defined in claim 8, wherein said processing functional block is operative to direct the message toward a destination pointed to by the address data element associated to the certain entry, when the address data element is valid.

10. A computing apparatus as defined in claim 9, wherein said Processing functional block is operative to determine the validity of the address data element associated to the certain entry by processing the address validation data element associated to the certain entry and a data element in the message.

11. A computing apparatus as defined in claim 10, wherein said processing functional block compares the address validation data element associated to the certain entry and the data element in the message to determine if the address data element associated to the certain entry is valid.

12. A computing apparatus as defined in claim 11, wherein said processing functional block is responsive to an address negation command associated with a given entry in said database to alter the address validation data element associated to the given entry for marking the address data element associated to the given entry as invalid.

13. A computing apparatus as defined in claim 12, wherein said processing functional block alters the address validation data element associated to the given entry for marking the address data element associated to the given entry as invalid by incrementing the address validation data element associated to the given entry.

* * * * *